United States Patent
Pereira et al.

(10) Patent No.: US 7,881,078 B2
(45) Date of Patent: Feb. 1, 2011

(54) TWELVE-PULSE HVDC TRANSMISSION

(75) Inventors: Marcos Pereira, Erlangen (DE); Kadry Sadek, Erlangen (DE)

(73) Assignee: Siemens AG, Munich (DE)

( * ) Notice: Subject to any disclaimer, the term of this patent is extended or adjusted under 35 U.S.C. 154(b) by 553 days.

(21) Appl. No.: 11/908,191

(22) PCT Filed: Mar. 6, 2006

(86) PCT No.: PCT/EP2006/060466
§ 371 (c)(1),
(2), (4) Date: Sep. 10, 2007

(87) PCT Pub. No.: WO2006/094952

PCT Pub. Date: Sep. 14, 2006

(65) Prior Publication Data
US 2009/0225570 A1  Sep. 10, 2009

(30) Foreign Application Priority Data
Mar. 9, 2005  (DE) ....................... 10 2005 012 371

(51) Int. Cl.
*H02M 5/45* (2006.01)

(52) U.S. Cl. ............................ 363/37; 363/34; 363/40; 363/48; 363/55; 363/98; 363/127

(58) Field of Classification Search .................. 363/37, 363/34, 40, 48, 55, 98, 127
See application file for complete search history.

(56) References Cited

U.S. PATENT DOCUMENTS

| | | | |
|---|---|---|---|
| 4,084,220 A * | 4/1978 | Akamatsu | 363/37 |
| 4,222,097 A | 9/1980 | Rogowsky | |
| 4,625,269 A | 11/1986 | Kanngiesser | |
| 4,849,870 A * | 7/1989 | Heinrich | 363/37 |
| 5,050,059 A * | 9/1991 | Neeser et al. | 363/65 |
| 5,249,114 A | 9/1993 | Asplund et al. | |

(Continued)

FOREIGN PATENT DOCUMENTS

DE  33 42 210 C2  5/1985

(Continued)

OTHER PUBLICATIONS

Gole, A.M.: New HVDC Converter Technologies, KEPRI Seminar, Oct. 2003, pp. 1-26.

(Continued)

*Primary Examiner*—Bao Q Vu
*Assistant Examiner*—Nguyen Tran
(74) *Attorney, Agent, or Firm*—Laurence A. Greenberg; Werner H. Stemer; Ralph E. Locher

(57) ABSTRACT

A device for transmitting electric power between alternating voltage networks includes converters interconnected by direct current lines and provided each with several six-pulse conversion bridges. The six-pulse conversion bridges of one same converter are capable of being connected to an alternating voltage network associated with the converters via inductances differently phase-shifted. A control unit is provided to energize the valves of the six-pulse conversion bridges. The device is more economical and the converters are interconnected by a plurality of direct current circuits, each direct current circuit being galvanically separated from at least an alternating voltage network.

14 Claims, 10 Drawing Sheets

U.S. PATENT DOCUMENTS

| | | | |
|---|---|---|---|
| 5,311,418 A | 5/1994 | Lalander | |
| 5,414,612 A | 5/1995 | Björklund et al. | |
| 5,539,654 A | 7/1996 | Åberg | |
| 5,666,277 A * | 9/1997 | Bjorklund et al. | 363/64 |
| 6,356,472 B1 | 3/2002 | Runkle et al. | |
| 2002/0047268 A1 | 4/2002 | Leijon et al. | |
| 2002/0167825 A1 * | 11/2002 | Okayama et al. | 363/37 |

FOREIGN PATENT DOCUMENTS

| | | |
|---|---|---|
| DE | 695 08 625 T2 | 11/1999 |
| DE | 696 21 697 T2 | 1/2003 |
| EP | 0 146 726 B1 | 7/1985 |
| EP | 0 740 387 B1 | 10/1996 |
| EP | 0 809 876 B1 | 12/1997 |
| EP | 1 385 259 A2 | 1/2004 |
| EP | 1 385 259 A3 | 4/2004 |
| JP | 01318561 | 12/1989 |
| JP | 5034482 A | 2/1993 |
| JP | 6502059 T | 3/1994 |
| JP | 8251937 A | 9/1996 |
| JP | 10505999 T | 6/1998 |
| JP | 2000232786 | 8/2000 |
| WO | 97/45907 | 12/1997 |

OTHER PUBLICATIONS

German Office Action dated Oct. 14, 2008.
English translation of Japanese Office Action dated Aug. 10, 2010.

* cited by examiner

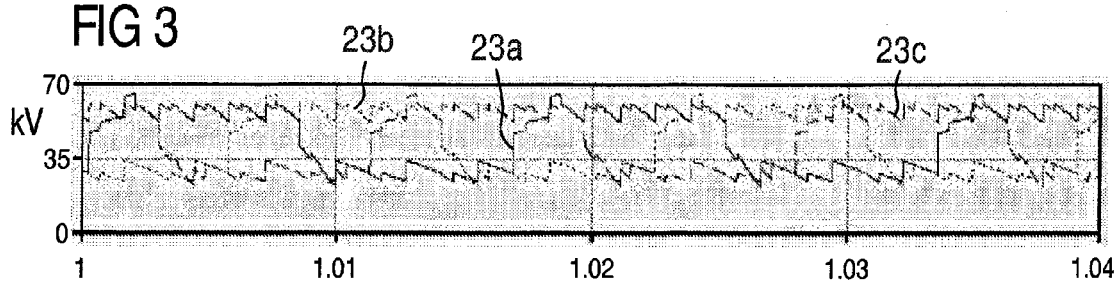
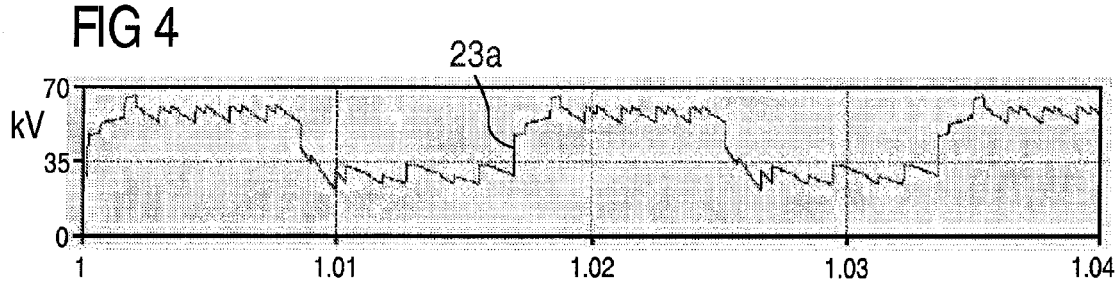
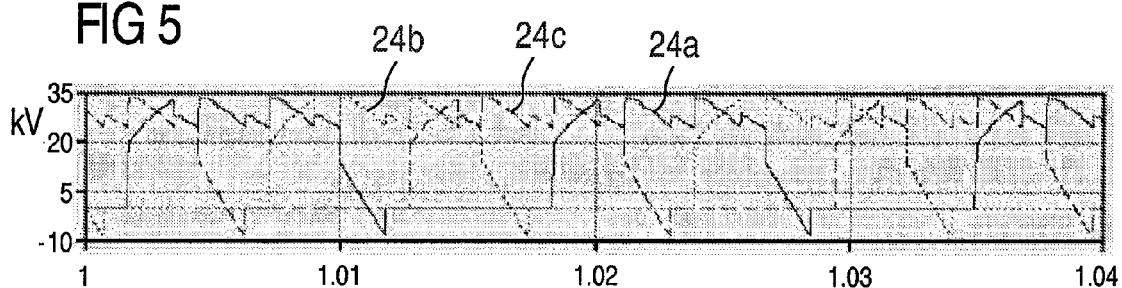
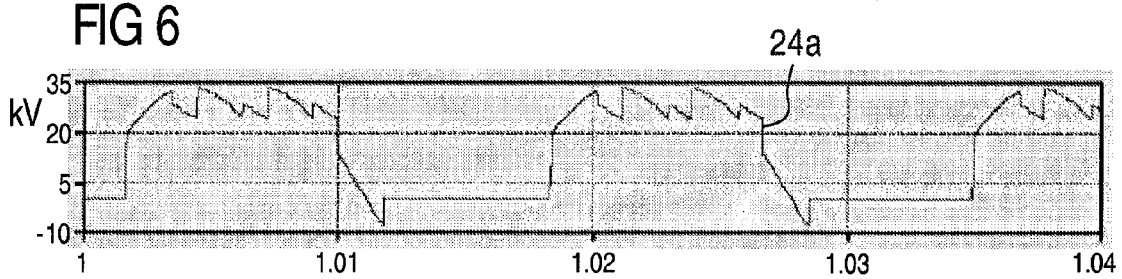
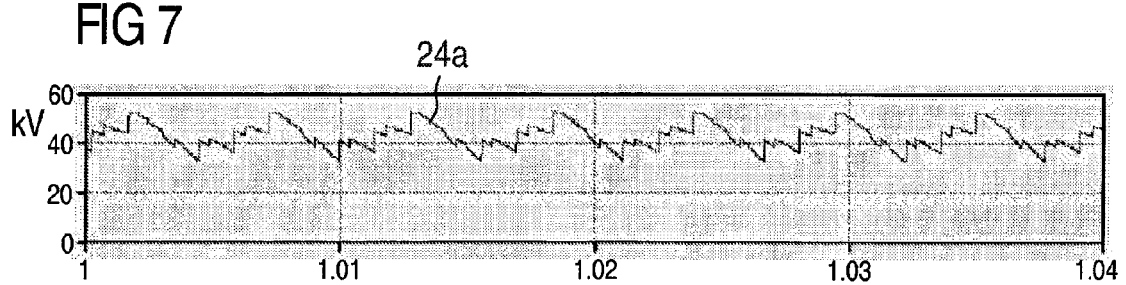

TWELVE-PULSE HVDC TRANSMISSION

BACKGROUND OF THE INVENTION

Field of the Invention

The invention relates to an apparatus for transmitting electrical power between AC voltage systems which has converters, which are connected to one another via DC lines and each have a plurality of six-pulse current converter bridges, it being possible for the six-pulse current converter bridges of the same converter to be connected via inductances with a different phase offset to an AC voltage system, which is associated in each case with the converters, and a control unit being provided for triggering current converter valves of the six-pulse current converter bridges.

Such an apparatus is already known, for example, from DE 33 42 210 C2, DE 696 21 697 T2 or DE 695 08 625 T2 and is illustrated by way of example in FIG. 1 as the prior art. The apparatus 1 shown there is provided for the transmission of electrical power between AC voltage systems 2 and 3, which each have three phases 2a, 2b and 2c and, respectively, 3a, 3b and 3c. The AC voltage systems 2 and 3 are connected via inductances 4 and 5, respectively, to in each case one associated converter 6 and 7, respectively, the converters 6, 7 being connected to one another via DC voltage lines 8 and 9. By means of the converters 6 and 7 as well as the DC voltage lines 8 and 9, a bipolar DC voltage circuit 10 is formed which is grounded at a grounding point 11. In addition, a smoothing inductor 12 for smoothing the DC voltage is provided in the DC voltage circuit 10. The inductances 4 and 5, via which the converters 6 and 7, respectively, are connected to the respectively associated AC voltage system 2 and 3, respectively, are in the form of transformers 4 and 5 in the exemplary embodiment shown, which transformers 4 and 5 each have a three-phase primary winding 13 and 14, respectively, as well as in each case two three-phase secondary windings 15 and 16 and, respectively, 17 and 18. In this case, the phases of the secondary winding which is denoted by the reference symbol 15 in FIG. 1 are star-connected to one another, while the phases of the secondary winding 16 are delta-connected to one another. During transmission of AC voltage, a phase shift of 30 degrees is thus produced between the secondary windings 15 and 16. The secondary winding 15 is connected to a three-phase six-pulse current converter bridge 19, which comprises six current converters with power semiconductor components and whose design and wiring is best known to a person skilled in the art, with the result that no further details need to be given at this point. Correspondingly, the secondary winding 16 is connected to a six-pulse current converter bridge 20, the secondary winding 17 to a six-pulse current converter bridge 21 and the secondary winding 18 to a six-pulse current converter bridge 22. Three-phase connecting sections 23, 24, and 26 are used to connect the secondary windings to the respectively associated six-pulse current converter bridges. The six-pulse current converter bridges of the converter 6 and the six-pulse current converter bridges 21 and 22 of the converter 7 are each connected in series with one another. Owing to the mentioned phase offset of 30 degrees at the AC-side input of the six-pulse current converter bridges 19, 20 and the fact that they are connected in series, a so-called twelve-pulse current converter is formed, reference being made, merely for reasons of completeness, to the fact that there is also a corresponding series circuit and a corresponding phase offset between the six-pulse current converter bridges 21 and 22 of the converter 7. The disturbance currents occurring during conversion are suppressed in a known manner by filter means 27, which are connected in parallel with a load on the AC side.

A control unit 200 is provided for controlling the six-pulse current converter bridges 19, 20, 21 and 22 comprising semiconductor valves 28. Owing to the phase offset between the current converter bridges 19 and 20 or 21 and 22, triggering pulses, i.e, one pulse per valve, are required for triggering the semiconductor valves 28 in one period of the alternating current 12. For this reason, the converters 6 and 7 are also referred to as twelve-pulse converters. The pulses have an interval of 30° in relation to one another. The significant advantage of a twelve-pulse converter as compared to a six-pulse converter comprising only one six-pulse current converter bridge consists in the fact that current disturbances, which are produced in the form of its 5th and 7th harmonic of the fundamental of the current during conversion, cancel one another out. Since the other harmonics triggered by the conversion can be canceled out more easily by filters than the 5th and 7th harmonic, the twelve-pulse arrangement has cost advantages over six-pulse conversion.

However, the previously known twelve-pulse converters are associated with the disadvantage that the inductances used are extremely cost-intensive since they are subject to additional loads. The increased loads can be attributed to a high DC voltage component at the secondary windings of the inductances, which are connected to the respective six-pulse current converter bridge via the connecting sections 23, 24, and 26.

BRIEF SUMMARY OF THE INVENTION

The object of the invention is therefore to provide an apparatus as mentioned at the outset which is more cost-effective.

The invention achieves this object by virtue of the fact that the converters are connected to one another via a plurality of DC circuits, each DC circuit being DC-isolated from at least one AC voltage system.

According to the invention, the converters, which are each associated with one AC voltage system, are connected to one another on the DC side via a plurality of DC circuits. This firstly has the disadvantage that the six-pulse current converters need to be connected to one another via additional DC voltage lines. However, the connection via separate DC voltage circuits allows for a broader design possibility when coupling the converters to the respectively associated AC voltage system. In other words, the design possibility of the inductances via which the converters can be connected to the respectively associated AC voltage system is broadened, with the result that, by expediently designing the inductances, their costs are reduced considerably. In this case, each DC circuit has an electromagnetic, i.e. inductive or capacitive, coupling for DC isolation of the AC voltage systems which are connected to one another. Owing to the DC isolation, the transmission of radiofrequency disturbances from one AC voltage system to the other is avoided. Complex additional filters, which are described, for example, in U.S. Pat. No. 5,414,612, can be avoided according to the invention, with the result that costs can also be saved in this way. According to the invention, twelve-pulse converters are also used, 12 initiating pulses for triggering the current converter valves being produced in one period of the AC voltage applied. As has already been mentioned in connection with the prior art, during twelve-pulse conversion the 5th and 7th harmonics of the current are canceled out which can only be eliminated in the case of six-pulse converters by an increased complexity in terms of the filtering of the AC voltage. Furthermore, higher powers can be transmitted between the AC voltage systems by twelve-pulse current converters.

Advantageously, a first DC circuit and the inductances connected to it are designed to be symmetrical with respect to the second DC circuit and the inductances connected to it. Owing to a symmetrical design of the arrangements, which comprise a DC circuit and the inductances associated with it, additional means when combining the powers transmitted via different DC circuits are now superfluous, with the result that additional costs are avoided.

In accordance with a preferred exemplary embodiment, a reference potential is impressed on the DC circuits via the grounding of the inductances. In accordance with this advantageous development, the grounding no longer takes place within the DC circuit but on the AC side with respect to the respective converter. Owing to the grounding of the inductances, their costs can be reduced further. In this case, there are various possibilities and developments which are given below.

Furthermore, in the context of the invention it is expedient that each six-pulse current converter bridge of a first converter is connected via a dedicated DC circuit to an associated six-pulse current converter bridge of a second converter, with the result that two six-pulse current converter bridges are arranged in each DC circuit. In accordance with this preferred exemplary embodiment of the invention, the two connection terminals of each six-pulse current converter bridge are connected to in each case one connection terminal of a six-pulse current converter bridge of another converter via a DC line. A series circuit of current converter bridges within a DC circuit is not possible in accordance with this development of the invention.

Expediently, the inductances are transformers, which are each associated with a converter and each have a polyphase primary winding, which can be connected to an associated AC voltage system, and a plurality of polyphase secondary windings, which are each connected to a six-pulse current converter bridge. Such transformers having more than one secondary winding are cost-intensive. In particular, transformers which are designed for higher transmission powers may have a single-phase design, these transformers each having a plurality of bushings for wiring the phases of the windings outside the transformers, to which bushings high-voltage overhead lines can be connected and which bushings move the high-voltage conductor over into another insulation medium.

In accordance with a development in this regard, the phases of the primary winding and the phases of one of the secondary windings are each star-connected to one another, the phases of a second secondary winding being delta-connected to one another. By means of this expedient and differing wiring of the secondary windings, a phase shift which is typical of twelve-pulse conversion is provided between the respective AC-side connections of the six-pulse current converter bridges of each converter. This is expediently 30 degrees, with the result that twelve triggering pulses are required in one period of the alternating current in order to trigger the twelve semiconductor valves of each converter in an expedient manner. The triggering pulses are provided according to the invention by a control unit, which is known per se and does not need to be explained in any more detail at this point.

Advantageously, the six-pulse current converter bridge of a first converter, which six-pulse current converter bridge is connected to the secondary winding of a first transformer whose phases are star-connected to one another, is connected on the DC side to a six-pulse current converter bridge of a second converter, which is connected on the AC side to a secondary winding of a second transformer, whose phases are delta-connected to one another. This wiring arrangement of the apparatus allows for the exclusive use of transformers as inductances, at the same time a symmetrical design of the DC circuits with the secondary windings associated with them of the transformers being made possible. In this case, the symmetry is produced by virtue of the fact that the phases of one six-pulse current converter bridge of the first converter are delta-connected to one another, while the other secondary winding of the same transformer is connected to the other six-pulse current converter bridge of the first converter. The six-pulse current converter bridge whose phases are delta-connected is connected on the DC side to one of the six-pulse current converter bridges, which is connected to a secondary winding of another transformer, whose phases are star-connected. The six-pulse current converter bridge of the first converter, which is connected to a secondary winding of the first transformer, whose phases are star-connected to one another, is, on the other hand, connected on the DC side to a six-pulse current converter bridge, which is DC-connected to a secondary winding of the second transformer, whose phases are delta-connected. In this case, the secondary windings forming the star point are each grounded. As has already been mentioned, it is conventional, in particular in the case of high powers to be transmitted, to design the HVDC transformers to be single-phase. The single-phase transformers therefore generally have three bushings for connecting high-voltage overhead lines. The wiring of the phases takes place outside the transformer housing. In the case of grounding of the star point, this acts for each phase on at least one of the bushings of the single-phase transformers. These bushings can be designed to be considerably more cost-effective owing to the ground potential applied.

In accordance with an exemplary embodiment which deviates from this, the inductances associated with a converter each comprise a transformer and a number of inductor coils which is dependent on the number of phases of the associated AC voltage system, it being possible for a first six-pulse current converter bridge of a first converter to be connected via first inductor coils and for a second six-pulse current converter bridge of the first converter to be connected via a first transformer to a first AC voltage system, and the phases of a primary winding of the first transformer being star-connected to one another with grounding and the phases of its secondary winding being delta-connected. In accordance with this exemplary embodiment, a transformer which has two secondary windings with different wiring of the phases is not used for reasons of cost. Instead, a conventional transformer having a primary winding and a secondary winding is used. The primary winding is DC-connected to the associated AC voltage system during operation of the apparatus according to the invention, the primary winding having a grounded star point. The secondary winding of this transformer is connected to a first six-pulse current converter bridge of the first converter. The second six-pulse current converter bridge of this converter, on the other hand, is DC-connected to the AC voltage system via inductor coils, a reference point for the potential of the DC voltage circuit in which the second six-pulse current converter bridge of the first converter is arranged being provided via the grounding of the primary winding of the transformer via the DC connection of the second converter bridge. A transformer having only one secondary winding and the use of inductor coils instead of a transformer having two or more secondary windings and different wiring is substantially more cost-effective and therefore has an effect on the efficiency of the entire apparatus.

In accordance with an advantageous development in this regard, the first six-pulse current converter bridge of the first converter is connected to a first six-pulse current converter bridge of a second converter, and the second six-pulse current converter bridge of the first converter is connected to a second six-pulse current converter bridge of a second converter, it being possible for the first six-pulse current converter bridge of the second converter to be connected via a second transformer and for the second six-pulse current converter bridge of the second converter to be connected via second inductor coils to the second AC system, the phases of a primary winding of the second transformer being star-connected to one another with grounding. In this way, symmetrical arrangements are formed which each comprise a DC circuit and the inductances associated with it, via which inductances DC circuits are connected to the respective AC voltage system during operation. The reference point of the potential of the respective arrangement is determined via the grounding of the primary winding of the respective transformer. Expediently, the difference in the phase shift between the first transformer and the first inductor coils is equal to the difference in the phase shift between the second transformer and the second inductor coils.

In an expedient development in this regard, each inductor coil is connected in each case to a tap of a phase of the grounded primary winding of the associated transformer. Instead of being DC-connected directly to the phases of the associated AC voltage system, the inductor coils and therefore the associated six-pulse current converter bridge are connected to a tap of the polyphase primary winding. The primary winding has, for example, a three-phase design and has for each phase one tap of the winding, for example in the center. The tap is passed to the outside from the transformer and can then be DC-connected to the inductor coils. The connection of the apparatus to the AC voltage system therefore has a simplified and more cost-effective design.

Advantageously, the inductances have a transformer having a secondary winding, whose phases are star-connected to one another with grounding. In accordance with this advantageous development, a potential reference point is impressed on each DC circuit by the grounding of the secondary winding. Grounding on the DC-voltage side is now superfluous.

Advantageously, each DC circuit has at least one smoothing inductor. In this case, the smoothing inductor is used for smoothing the DC voltage. The use of smoothing inductors in HVDC transmission is generally known, with the result that no further details need to be given at this point.

Advantageously, filter means for the AC-side suppression of harmonics resulting during the conversion are provided.

Expediently, the current converter valves are in the form of thyristor valves.

Advantageously, the DC conductors have a length of less than 50 km. The advantage of the more cost-effective design possibility is lost in the case of greater distances between the converters since, in comparison with the prior art, more DC conductors are required in the context of the invention.

In a preferred exemplary embodiment, the apparatus is a back-to-back link, in which the converters are positioned in the same installation in a so-called "back-to-back" arrangement.

BRIEF DESCRIPTION OF THE SEVERAL VIEWS OF THE DRAWING

Further expedient configurations and advantages of the invention are the subject matter of the description below relating to exemplary embodiments of the invention with reference to the figures of the drawing, in which functionally identical components have been provided with the same reference symbols and in which:

FIGS. 3-7 show voltage profiles at the secondary-side connection of the transformer 4 of an apparatus as shown in FIG. 1 and therefore in accordance with the prior art.

FIG. 1 shows a previously known apparatus 1 for transmitting electrical powers between AC voltage systems 2, 3 via high-voltage direct current with converters 6, 7, which have semiconductor valves and are triggered twelve times by a control unit 200 in one period of the alternating current. The previously known apparatus 1 has already been described in connection with the acknowledgement of the prior art.

DESCRIPTION OF THE INVENTION

Figure 2:
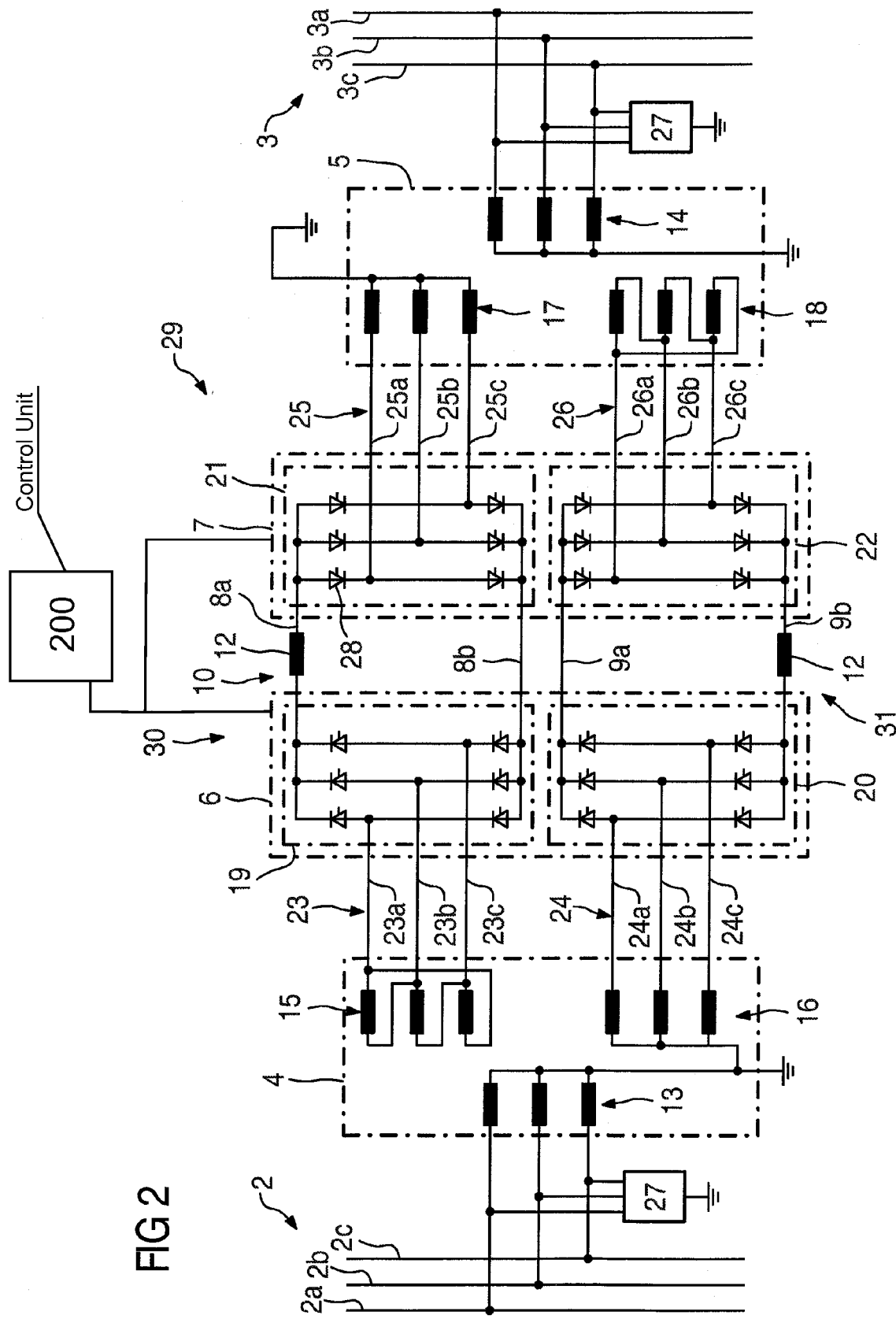
FIG. 2 shows an exemplary embodiment of the apparatus according to the invention in a schematic illustration.

FIG. 2 shows an exemplary embodiment of the apparatus 29 according to the invention in a schematic illustration. The apparatus 29 shown is used for transmitting electrical power from the AC voltage system 2 to the AC voltage system 3 illustrated on the right-hand side in FIG. 2, which each comprise three phases 2a, 2b, 2c and 3a, 3b, 3c, respectively. The AC voltage systems 2 and 3 are connected via associated inductances 4 and 5, respectively, which in the exemplary embodiment shown are in the form of transformers 4 and 5, to converters 6 and 7, which each have two six-pulse current converter bridges 19 and 20 and, respectively, 21 and 22.

The six-pulse current bridge circuits known as such comprise three phases, two current converter valves in the form of power semiconductors, in this case thyristor valves 28, being arranged in each phase. In contrast to the previously known apparatus shown in FIG. 1, the six-pulse current converter bridges 19 and 20 or 21 and 22 are not connected in series with one another and connected via a common DC voltage circuit to the respective other converter. Instead, the six-pulse current converter bridges 19 and 21 are part of a DC voltage circuit 30, which comprises, in addition to the six-pulse current converter bridges 19 and 21, the DC lines 8a and 8b. A further DC circuit 31 comprises the six-pulse current converter bridges 20 and 22 as well as the DC lines 9a and 9b. The converters 6 and 7 are therefore connected to one another by means of two DC voltage circuits 30 and 31. In comparison with the prior art, two further DC lines can be provided in the context of the invention, with the result that, owing to economic considerations, the distances between the converters 6 and 7 should remain restricted to a specific dimension. In the exemplary embodiment shown, the apparatus shown is a so-called back-to-back link, in which the converters 6 and 7 are arranged directly next to one another. In other words, the DC lines 8a, 8b, 9a and 9b have a length of the order of magnitude of a few meters. The DC circuits are connected, via the connecting sections 23 and 25 or 24 and 26, on the AC side to in each case one secondary winding, which are designed to be three-phase, as are the connecting sections 23, 24, 25 and 26. The arrangement comprising the three-phase secondary winding 15, the DC voltage circuit 30 and the secondary winding 17 is designed to be symmetrical with respect to the arrangement comprising the secondary winding 16, the DC circuit 31 and the secondary winding 18. Thus, the phases of in each case one secondary winding of these arrangements 15 or 18 are delta-connected to one another, whereas the phases of the respective other secondary winding are connected so as to form a star point. In this case, the star point is grounded, with the result that a ground reference potential is impressed on the DC circuits 30 and 31 via the partial inductances 17 and 16. Grounding on the DC side is not provided in the context of the invention. Owing to the symmetrical design, the phase shift between the connecting sections 23 and 24 or 25 and 26 is canceled again. In the exemplary embodiment according to the invention as well, filter means 27 for suppressing harmonics of the rated frequency of the alternating current are provided.

FIGS. 3 to 7 show the voltage drops across the connecting sections 23 and therefore across the bushings (not illustrated in the figures) of the transformers 4 and 5 in relation to the ground potential in kilovolts (kV) as a function of time. The voltage profiles shown have been calculated using a digital simulation program in accordance with D. A. Woodford, "Validation of Digital Simulation of DC Links", IEEE Transaction on Power Apparatus and Systems, PAS-104, #9, pages 2588-2596, September 1985. It has been assumed here that the energy is transmitted from the AC voltage system 2 to the AC voltage system 3. A total resistance of $0.35\Omega$ and an inductance of 35 mH for the DC voltage circuit including the smoothing inductors have been assumed in the simulations.

In FIG. 3, the continuous line corresponds to the voltage profile on the connecting section 23a, the dotted line indicates the voltage profile on the connecting section 23b and the dashed line indicates the voltage profile in the connecting section 23c. For reasons of clarity, the voltage profile of a single connecting section, to be precise the voltage profile of the connecting section 23a, is shown in FIG. 4.

FIG. 5 is a corresponding illustration of the voltage profile as a function of time, the voltage in this case dropping across the connecting sections 24 and therefore across the bushings of the secondary winding 16 of the transformer 4, whose phases are delta-connected. The continuous line represents the voltage drop in the connecting section 24a, the dotted line is the voltage drop in the connecting section 24b and the dashed line is the voltage drop in the connecting section 24c. Again for reasons of clarity, the voltage profile of the connecting section 24a is shown in FIG. 6. FIG. 7 shows the voltage profile at the star point. It can be seen from FIGS. 3 and 4 that there is a high DC voltage component in the connecting sections. Thus, the voltage does not change its mathematical sign but fluctuates between 70 and 30 kV. The same applies to the connecting sections which are delta-connected to the secondary winding. As can be seen in particular from FIG. 6, the voltage fluctuates between 0 and 35 kV. The zero point also has a more or less constant DC voltage component of 40 kV. Owing to the high DC voltage component, the transformers are subjected to a greater load than usual. In order to manage these loads, such HVDC transformers are designed correspondingly and are therefore cost-intensive.

FIGS. 8 to 12 show an illustration corresponding to FIGS. 3 to 7, but this time an apparatus according to the invention as shown in FIG. 2. The voltage drops between the phases of the secondary windings and the current flowing through the secondary windings correspond to their respective analogs in the calculations illustrated in FIGS. 3 to 5. The current flowing through the DC circuit(s) was 3000 A in both calculated examples. The power transmitted between the converters 6 and 7 is likewise the same in both cases.

Figure 8:
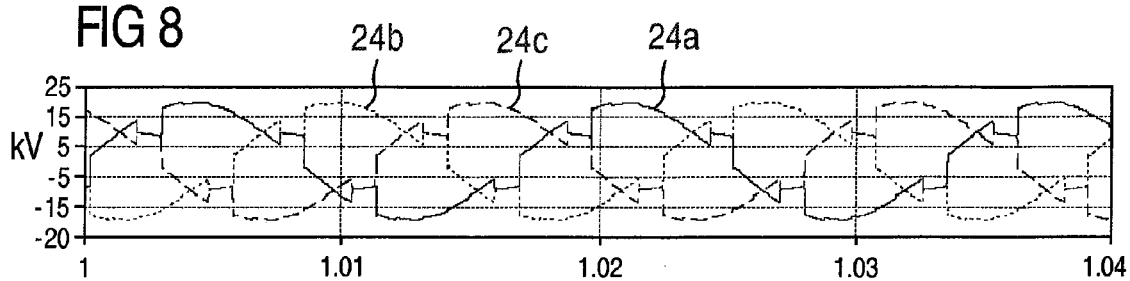
FIGS. 8-12 show voltage profiles at the secondary-side connection of the transformer 4 of an apparatus as shown in FIG. 2 as an exemplary embodiment of the invention.
Figure 9:
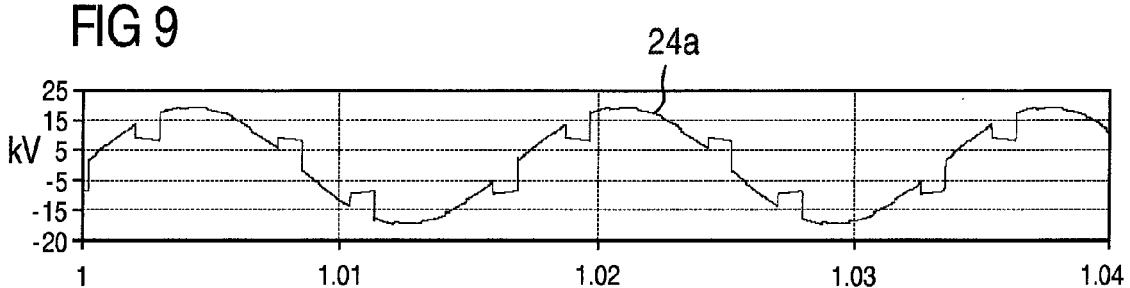
Figure 10:
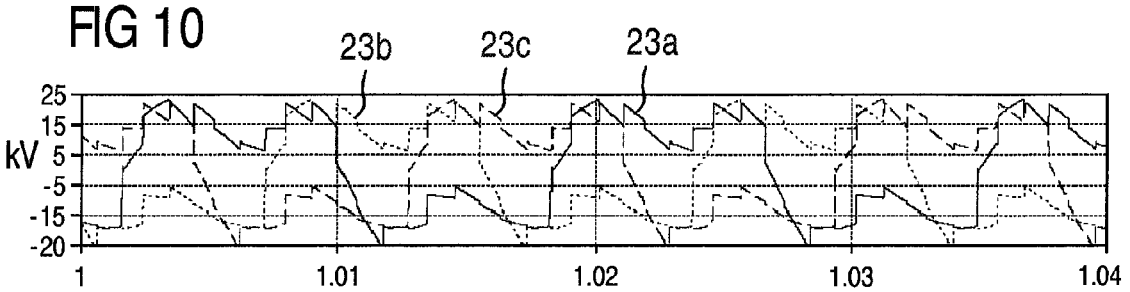
Figure 11:
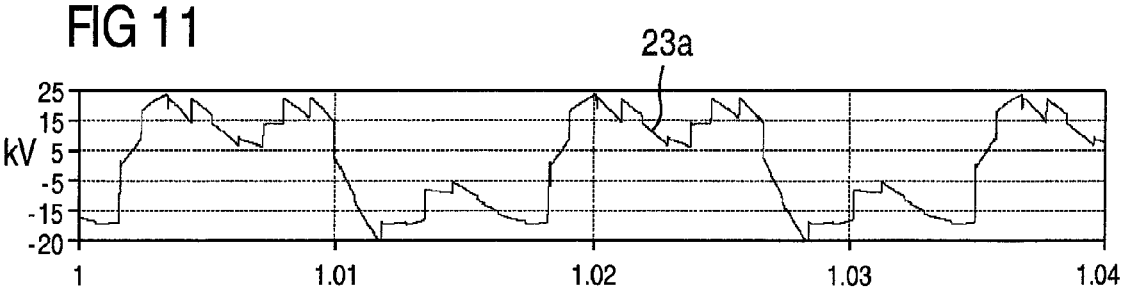
Figure 12:
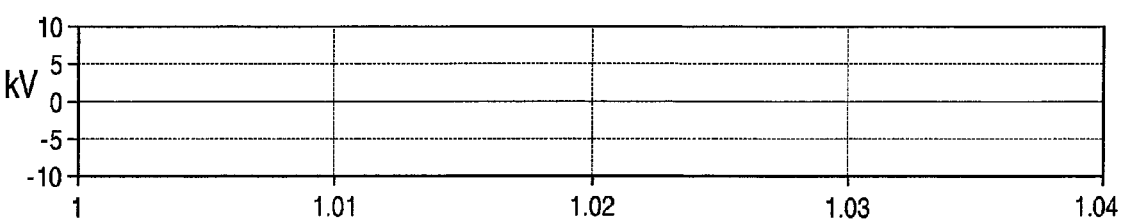

FIG. 8 shows the voltage profiles of the connecting sections 24, which are connected to a secondary winding, whose phases are star-connected to one another with grounding. In this case, the continuous line corresponds to the voltage profile in the connecting section 24a, the dotted line corresponds to the voltage profile in the connecting section 24b and the dashed line corresponds to the voltage profile in the connecting section 24c. FIG. 9 corresponds in turn to the voltage profile in the connecting section 24a. In turn, FIG. 10 shows the voltage profiles of the connecting sections 23a, 23b and 23c, which are connected to a secondary winding, whose phases are delta-connected. FIG. 11 shows the voltage profile of only a single connecting section 23a. FIG. 12 shows the voltage profile of the grounded star point of the secondary winding 16. It can be seen from FIGS. 8 and 9 that the voltage profiles of the respective connecting section fluctuate about a zero point and have a change of mathematical sign. The voltage amplitude is of the order of magnitude of approximately 17 kV. The same can also be observed on the connecting sections 23a to 23c, which are delta-connected to the secondary winding. DC voltage components cannot be observed; the voltage varies periodically between approximately +20 and −20 kV. The voltage, as expected, is equal to zero at the grounded star point of the secondary winding 16 of the transformer 4.

Figure 1:
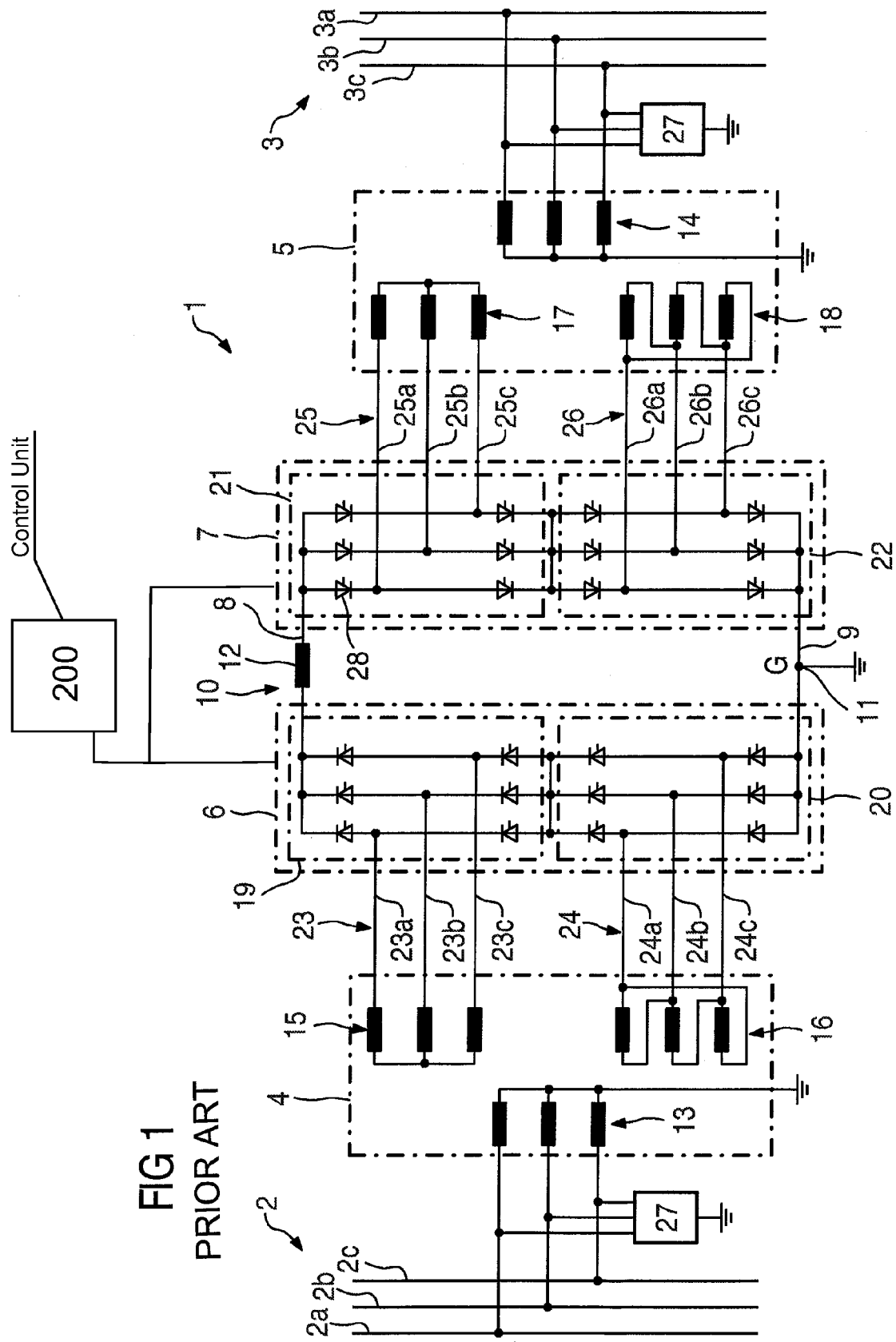
FIG. 1 shows a previously known twelve-pulse apparatus for transmitting electrical power between AC voltage systems via direct current in accordance with the prior art.
Figure 13:
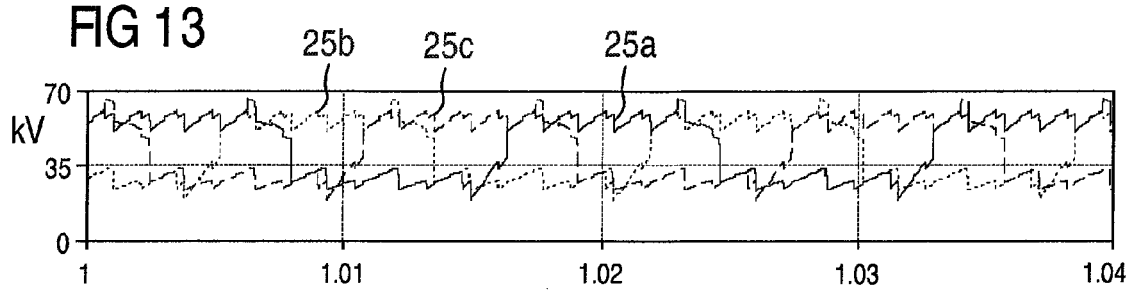
FIGS. 13-17 show voltage profiles at the secondary-side connection of the transformer 5 illustrated on the right-hand side in FIG. 1 of an apparatus in accordance with the prior art.
Figure 14:
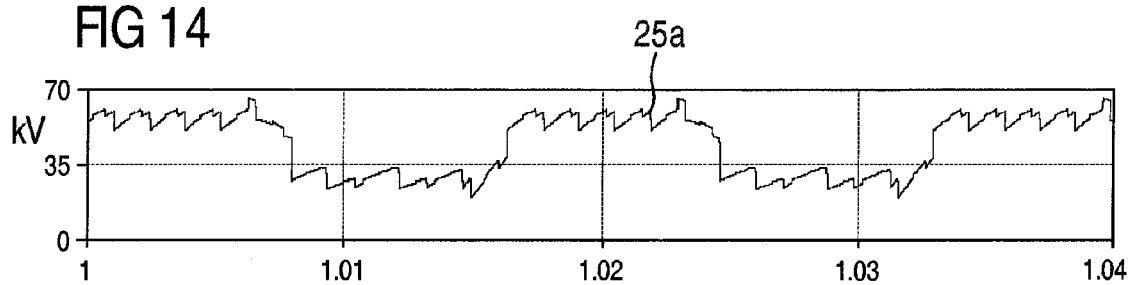
Figure 15:
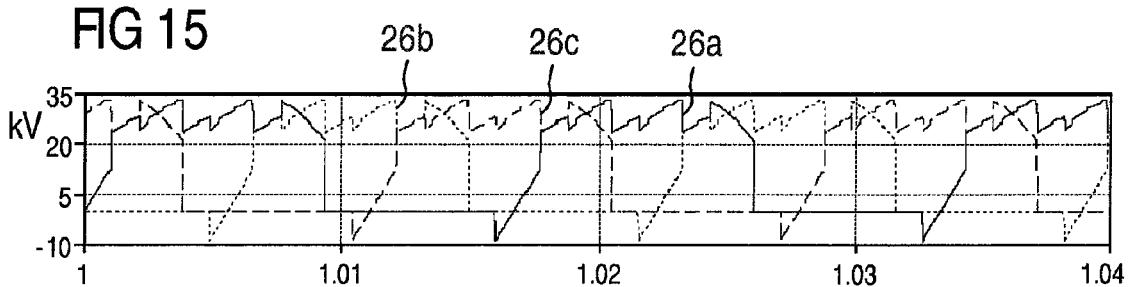
Figure 16:
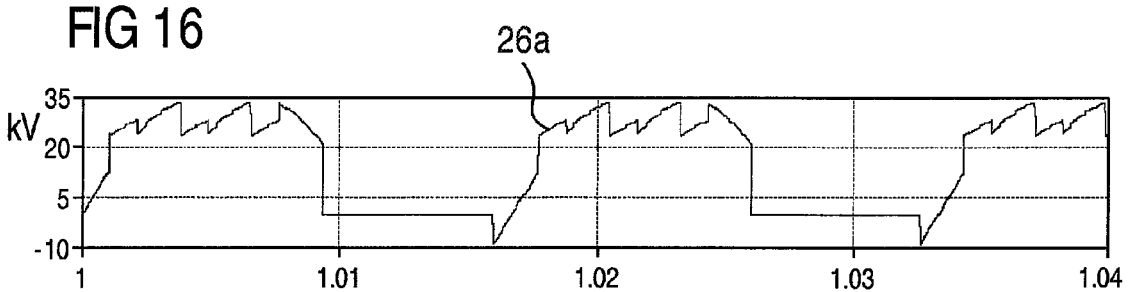
Figure 17:
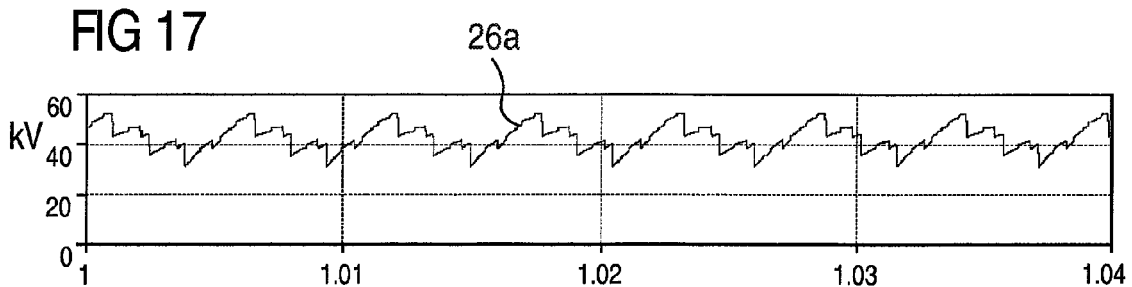
Figure 18:
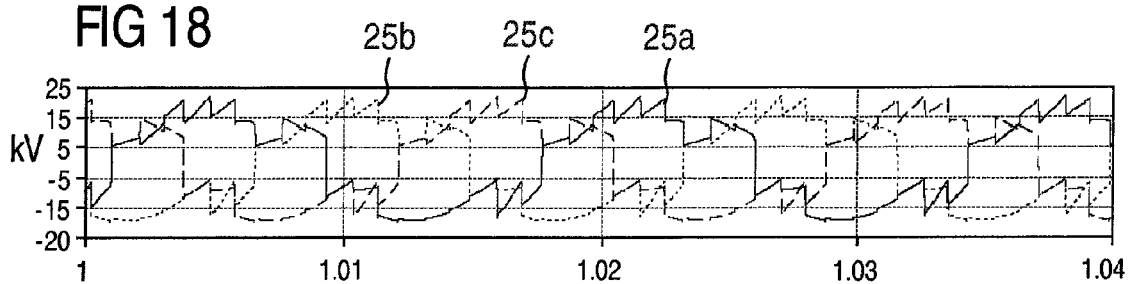
FIGS. 18-22 show voltage profiles at the secondary-side connection of the transformer 5 illustrated on the right-hand side in FIG. 2 of an apparatus in accordance with the present invention.
Figure 19:
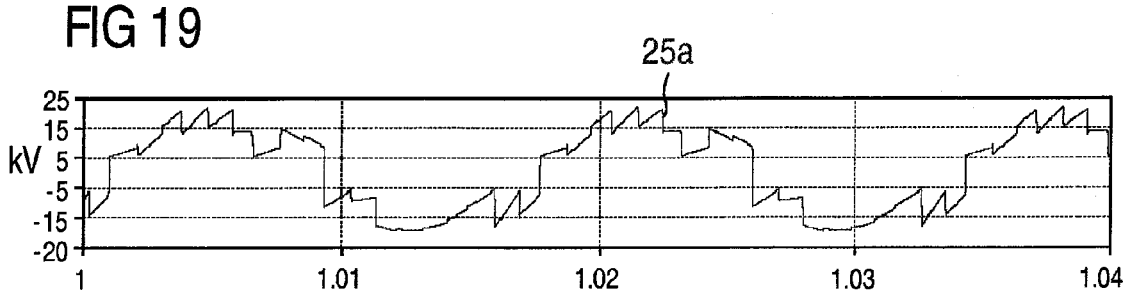
Figure 20:
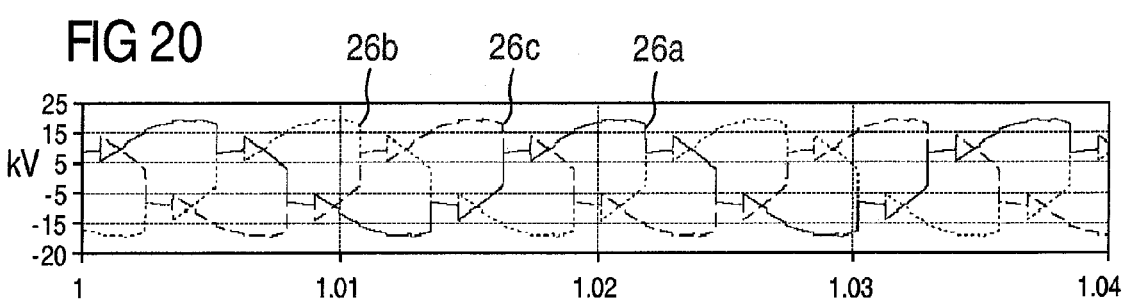
Figure 21:
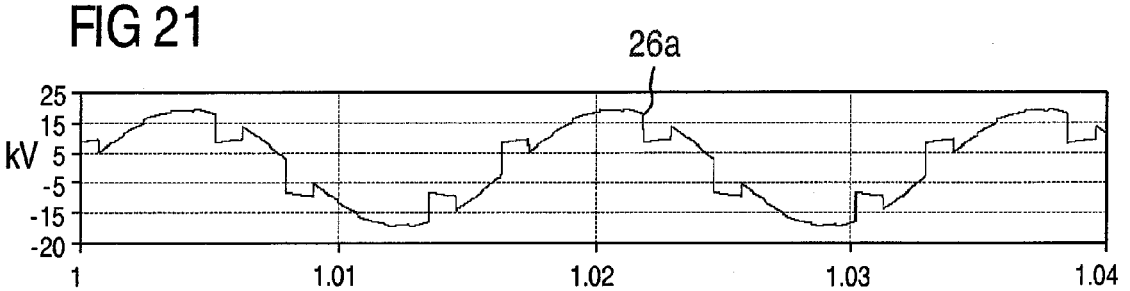
Figure 22:
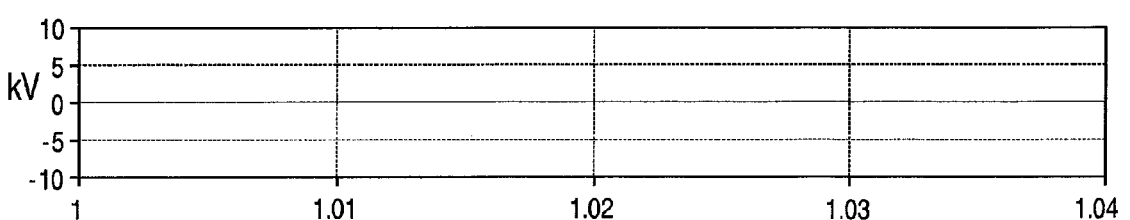

FIGS. 13 to 17 and FIGS. 18 to 22 illustrate corresponding calculations for the converter 7 associated with the AC voltage system 3 and, respectively, for the transformer 5. FIGS. 13 and 18, respectively, show the voltage drop between the respective phase of the connecting section 25a, 25b and 25c and the ground potential, the phases of the secondary winding each being star-connected to one another. FIG. 14 shows the voltage drop across the connecting section 24a in FIG. 1 and FIG. 19 shows the voltage drop in the connecting section 25a in FIG. 2. FIGS. 15, 16 and 20, 21, respectively, show the voltage profiles of the phases of the connecting section 26 of the previously known apparatus 1 shown in FIG. 1 and, respectively, the apparatus 29 according to the invention shown in FIG. 2. FIG. 17 and FIG. 22, respectively, show the voltage profile of the associated star point. As has already been described in connection with FIGS. 3 to 7 and 8 to 12, the connecting sections and therefore the secondary windings of the transformer 5 are subjected to less severe loading by means of DC components according to the invention. Thus, the voltage between the connecting section 25 and ground potential fluctuates between approximately 70 and 40 kV, whereas, according to the invention, amplitudes of the order of magnitude of 20 kV are obtained and the voltage fluctuates periodically about the zero point.

The amplitude of the voltage across the secondary winding 18 of the transformer 5 whose phases are delta-connected is approximately 35 kV, whereas, in the context of the invention, a maximum amplitude of approximately 25 kV is achieved on the corresponding secondary winding 18. By definition the voltage drop at the star point is equal to zero in the context of the invention.

It can be seen that the voltage loads of the two transformers in the context of the invention are considerably reduced, with the result that the transformers can be designed to be more cost-effective. Thus, according to the invention substantially smaller distances need to be maintained between the connections of the, for example, single-phase transformers, i.e. between the outdoor bushings, than in apparatuses in accordance with the prior art.

Figure 23:
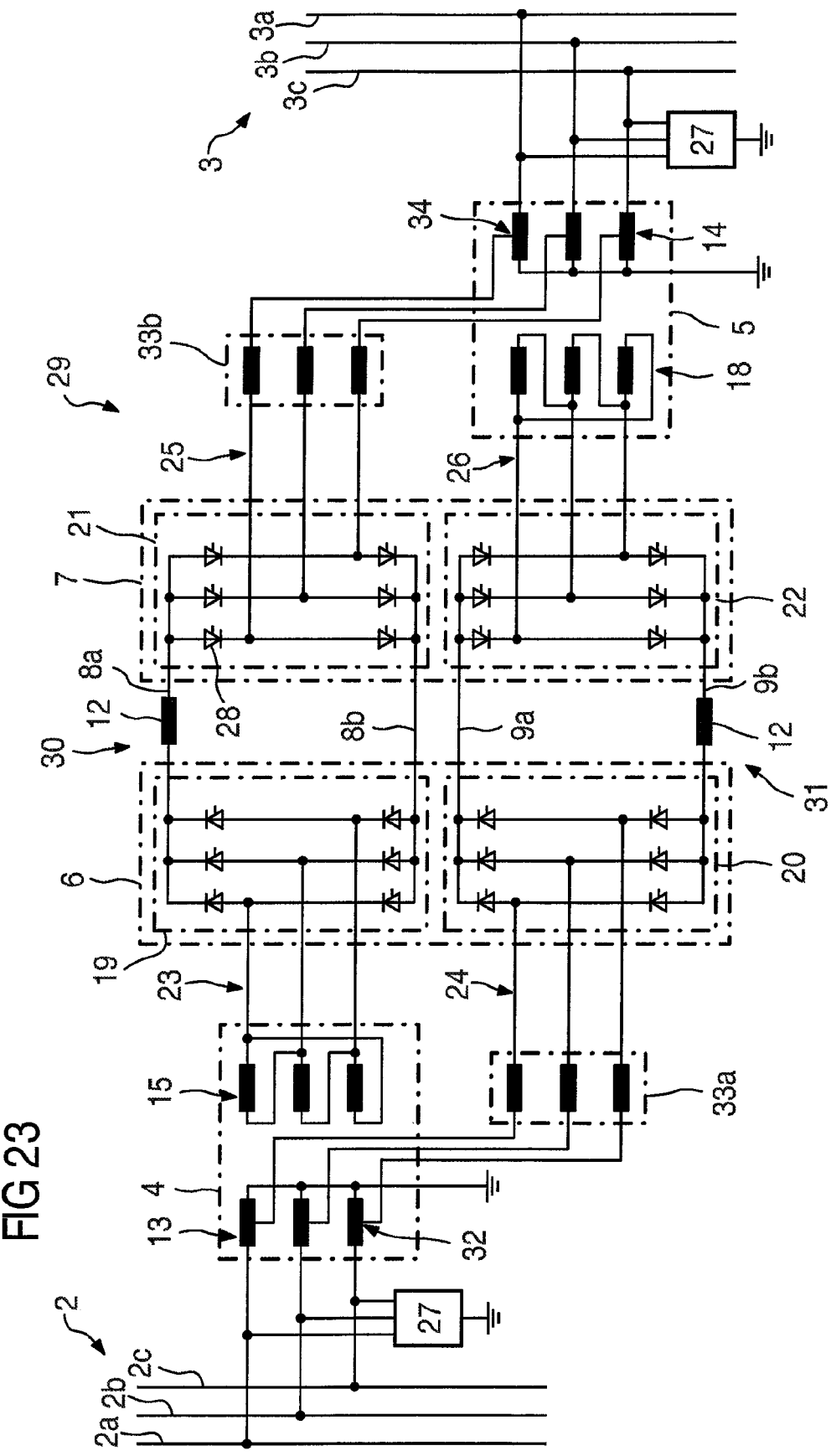
FIG. 23 shows a further exemplary embodiment of the apparatus according to the invention.

FIG. 23 shows a further exemplary embodiment of the apparatus according to the invention. The exemplary embodiment shown differs from the exemplary embodiment shown in FIG. 2 by virtue of the fact that the transformer 4 has only one three-phase secondary winding 15 whose phases are delta-connected, which secondary winding is connected to the six-pulse current converter bridge 19 via the three-phase connecting sections 23. The six-pulse current converter bridge 20 of the same converter 6, on the other hand, is connected via inductor coils 16 to taps 32 of the three-phase primary winding 13 of the transformer 4. The DC circuit 30 comprising the six-pulse current converter bridges 19 and 21 as well as the DC lines 8a and 8b is therefore DC-isolated from the supply system 2. The current converter bridge 21 is connected to taps 34 of the three-phase primary winding of the AC voltage system 3 by the three-phase connecting section 25 and the inductor coils 23. The grounding of the DC circuit 30 takes place via the DC-connection to the three-phase primary winding 14, whose phases are star-connected to one another and whose star point is grounded. The arrangement comprising the secondary winding 15, the DC circuit 30 and the inductor coils 33b is symmetrical with respect to the arrangement comprising the inductor coils 33a in the DC circuit 31 and the three-phase secondary winding 18 whose phases are delta-connected. The grounding of the DC circuit 31 therefore takes place via the grounding of the primary winding 13 of the transformer 5, whose phases are star-connected to one another and whose star point is grounded.

Figure 24:
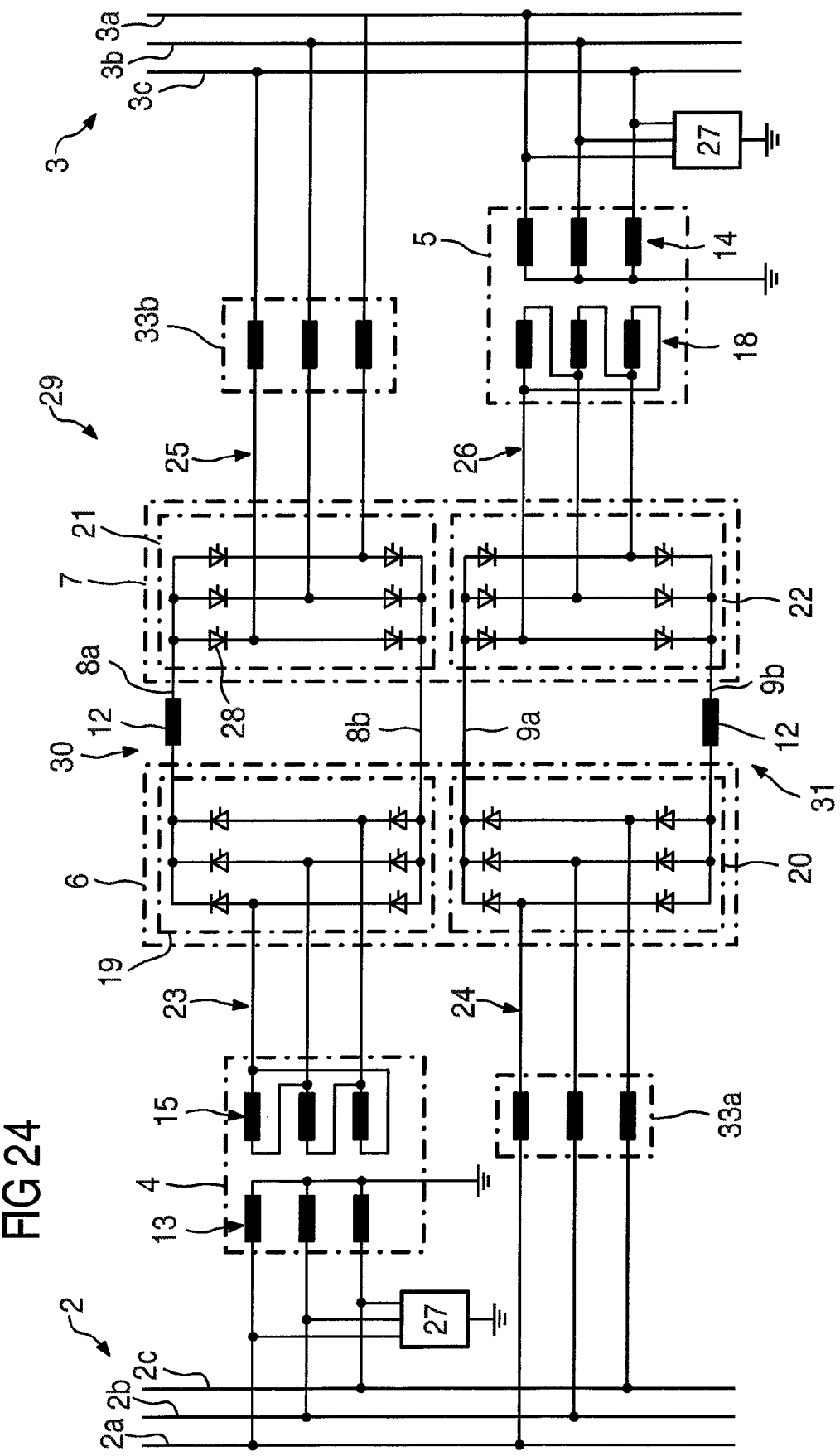
FIG. 24 shows a further exemplary embodiment of the apparatus according to the invention.

FIG. 24 shows a further exemplary embodiment in accordance with the invention which differs from the exemplary embodiment shown in FIG. 23 by virtue of the fact that the inductor coils 33a and 33b are not connected to taps of the primary winding of a transformer. Instead, the six-pulse current converter bridges 20 and 21 are connected via the inductor coils 33a and 33b, respectively, directly to the respectively associated three-phase voltage system 2 and 3. Here too, the grounding of the DC circuits 30 and 31 takes place via the grounding of the star point of the polyphase primary winding 13 and 14, respectively, of the transformer 4 and 5, respectively. The arrangements comprising the inductances and the DC circuits are again designed to be symmetrical with respect to one another. Reference is made here to the fact that, during operation of the apparatus 29 according to the invention, even in all exemplary embodiments, the AC voltage systems 2 and 3 are DC-isolated from one another. Measures for preventing or suppressing so-called zero system disturbance currents are now superfluous according to the invention. The DC isolation takes place in the exemplary embodiments shown by the transformers 4 and 5.

Figure 25:
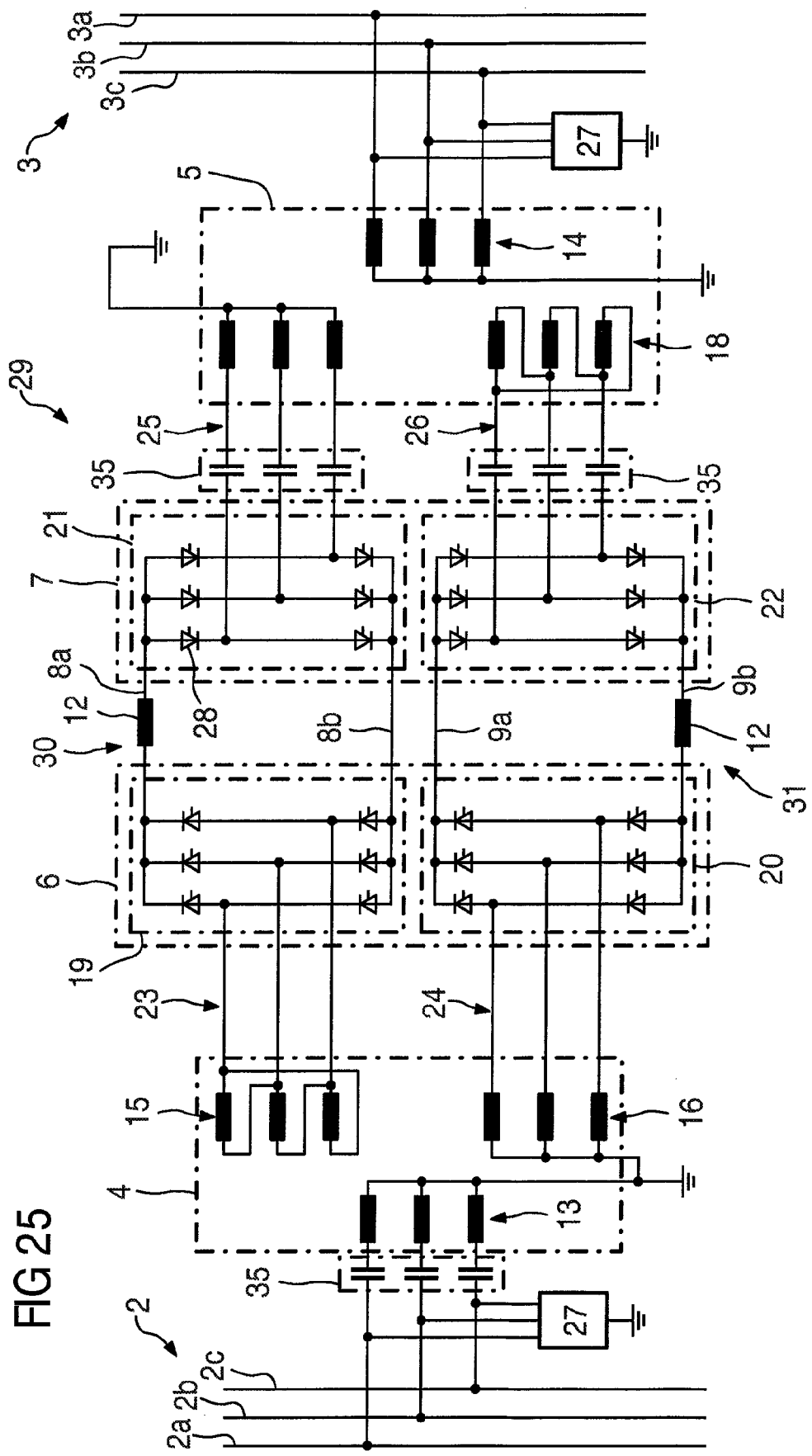
FIG. 25 shows a further exemplary embodiment of the apparatus according to the invention.

FIG. 25 shows a further exemplary embodiment of the apparatus 29 according to the invention which differs from the exemplary embodiment shown in FIG. 2 by the use of capacitors 35, which are each integrated on the AC side in the apparatus 29. The capacitors 35 are used for power factor correction. The arrangement of the capacitors 35 on the AC-voltage side of the apparatus 29 according to the invention may be as desired. It is thus possible, for example, to arrange the capacitors 35 or capacitor battery, which has one capacitor for each phase of the system, between the AC voltage system 2 and the primary winding 13 of the transformer 4. This is shown, for example, in the left-hand half of FIG. 25. As a deviation from this, it is possible to arrange the capacitors 35 or capacitor battery between the converter 7 and the transformer 5, as is shown in FIG. 25 on the right-hand side in connection with the converter 7 and the transformer 5.

Figure 26:
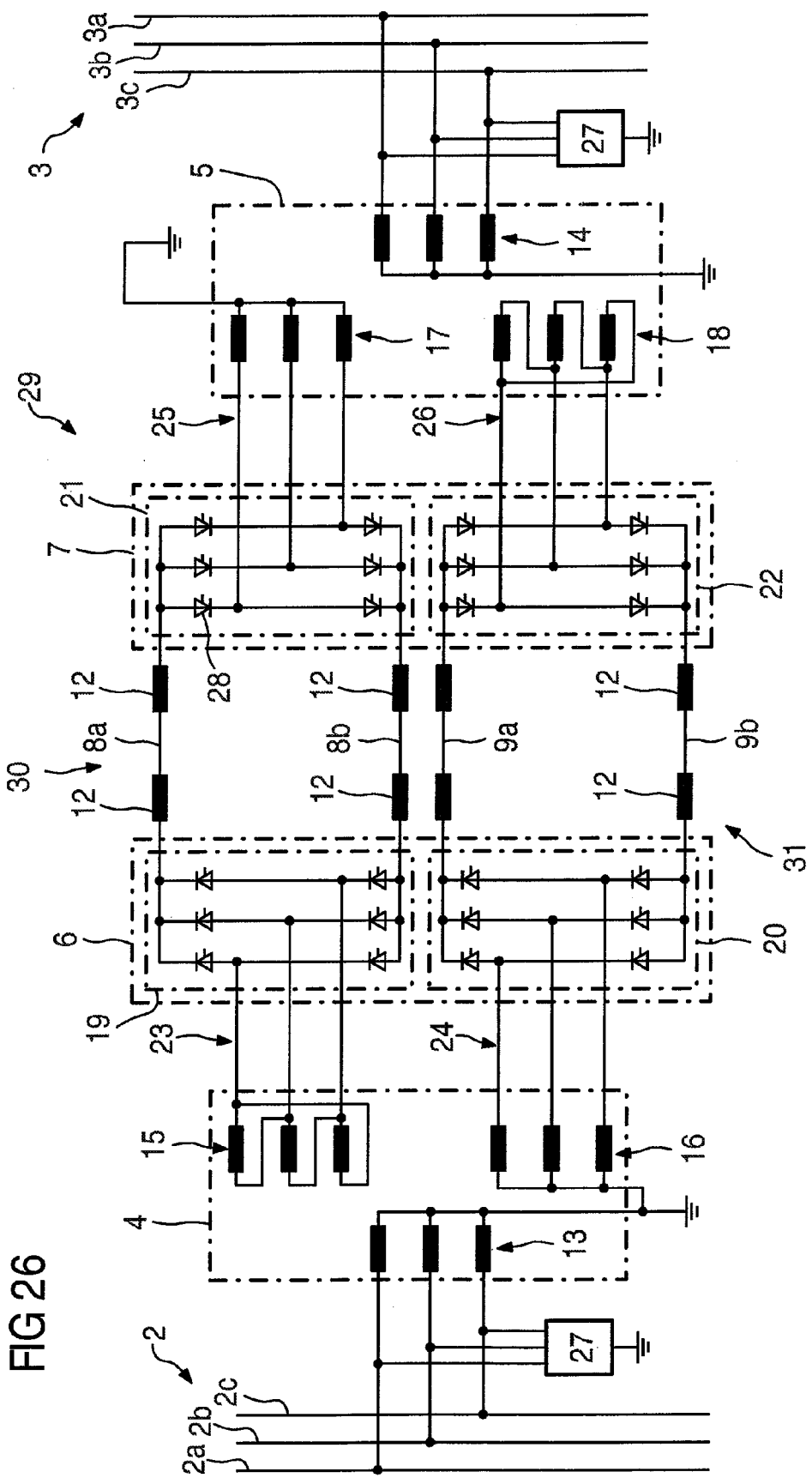
FIG. 26 shows a further exemplary embodiment of the apparatus according to the invention.

FIG. 26 shows a further exemplary embodiment of the apparatus 29 according to the invention which differs from the exemplary embodiment shown in FIG. 2 merely by the use of a plurality of smoothing inductors in the DC voltage circuits 30 and 31. Thus, the smoothing inductors 12 are arranged on the DC-voltage side at each terminal of the six-pulse current converter bridge, with the result that in total four smoothing inductors 12 are arranged in the respective DC voltage circuit 30 and 31, respectively.

The invention claimed is:

1. An apparatus for transmitting electrical power between alternating voltage systems, comprising:
    a plurality of converters connected to one another via d.c. lines and each having a plurality of six-pulse current converter bridges with current converter valves;
    a plurality of d.c. circuits connecting said converters to one another, each of said d.c. circuits being galvanically isolated from at least one alternating voltage system;
    inductances with different phase offsets for connecting said six-pulse current converter bridges of a respectively same converter to the alternating voltage system associated with said converter;
    a control unit for triggering said current converter valves of said six-pulse current converter bridges; and
    an intermediate DC link between said six-pulse current converter bridges being uncoupled from each other:
    wherein said inductances are grounded in each case for impressing a reference potential on said d.c. circuits.

2. The apparatus according to claim 1, wherein a first said d.c. circuit and said inductances connected thereto are symmetrical with respect to a second said d.c. circuit and said inductances connected thereto.

3. The apparatus according to claim 1, wherein each six-pulse current converter bridge of a first converter is connected via a dedicated d.c. circuit to an associated first six-pulse current converter bridge of a second converter, resulting in two six-pulse current converter bridges to be connected in each said d.c. circuit.

4. The apparatus according to claim 1, wherein said inductances are transformers each associated with a converter and each having a polyphase primary winding, which can be connected to an associated AC voltage system, and a plurality of polyphase secondary windings, which are each connected to a six-pulse current converter bridge.

5. The apparatus according to claim 4, wherein the phases of the primary winding and the phases of one of the secondary windings are each star-connected to one another, and the phases of a second secondary winding are delta-connected to one another.

6. The apparatus according to claim 5, wherein the six-pulse current converter bridge of a first converter, which six-pulse current converter bridge is connected to the secondary winding of a first transformer whose phases are star-connected to one another, is connected on the DC side to a six-pulse current converter bridge of a second converter, which is connected on the AC side to a secondary winding of a second transformer whose phases are delta-connected to one another.

7. The apparatus according to claim 1, wherein the inductances associated with a converter each comprise a transformer and a number of inductor coils which is dependent on the number of phases of the associated AC system, it being possible for a first six-pulse current converter bridge of a first converter to be connected via first inductor coils and for a second six-pulse current converter bridge of the first converter to be connected via a first transformer to a first AC voltage system, and the phases of the primary winding being star-connected to one another with grounding.

8. The apparatus according to claim 7, wherein the first six-pulse current converter bridge of the first converter is connected to a first six-pulse current converter bridge of a second converter, and the second six-pulse current converter bridge of the first converter is connected to a second six-pulse current converter bridge of the second converter, it being possible for the first six-pulse current converter bridge of the second converter to be connected via a second transformer and for the second six-pulse current converter bridge of the second converter to be connected via second inductor coils to a second AC system, the phases of the primary winding of the second transformer being star-connected to one another with grounding.

9. The apparatus according to claim 7, wherein each inductor coil is connected in each case to a tap of a phase of the grounded primary winding of the associated transformer.

10. The apparatus according to claim 1, wherein the inductances have a transformer having a secondary winding, whose phases are star-connected to one another with grounding.

11. The apparatus according to claim 1, wherein each d.c. circuit has at least one smoothing inductor.

12. The apparatus according to claim 1, characterized by filter means for the AC-side suppression of harmonics resulting during the conversion.

13. The apparatus according to claim 1, wherein the current converter valves are thyristor valves.

14. The apparatus according to claim 1, wherein the DC conductors have a length of less than 50 kilometers.

* * * * *